(12) United States Patent
Hannuksela

(10) Patent No.: US 7,843,974 B2
(45) Date of Patent: Nov. 30, 2010

(54) AUDIO AND VIDEO SYNCHRONIZATION

(75) Inventor: Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 934 days.

(21) Appl. No.: 11/174,292

(22) Filed: Jun. 30, 2005

(65) Prior Publication Data

US 2007/0002902 A1  Jan. 4, 2007

(51) Int. Cl.
*H04J 3/06* (2006.01)
(52) U.S. Cl. .................. 370/509; 380/206; 713/176
(58) Field of Classification Search ............... 370/503, 370/509–515; 713/176; 380/206, 221, 274
See application file for complete search history.

(56) References Cited

U.S. PATENT DOCUMENTS

| | | | | |
|---|---|---|---|---|
| 5,668,601 | A * | 9/1997 | Okada et al. ................. | 370/503 |
| 6,570,945 | B1 * | 5/2003 | Minoshima et al. .......... | 370/509 |
| 2003/0135822 | A1 | 7/2003 | Evans | |
| 2003/0138043 | A1 * | 7/2003 | Hannuksela ............ | 375/240.08 |
| 2004/0207723 | A1 | 10/2004 | Davis et al. | |
| 2006/0277410 | A1 * | 12/2006 | Jajodia et al. ............... | 713/176 |

FOREIGN PATENT DOCUMENTS

| | | |
|---|---|---|
| EP | 0598499 | 5/1994 |
| EP | 1307038 | 5/2003 |
| RU | 2208301 | 7/2003 |

OTHER PUBLICATIONS

"Steganography & Digital Watermarking: Information Hiding;" Feb. 4, 2005; Retrieved from the Internet Archive Wayback Machine on Sep. 19, 2006.

* cited by examiner

*Primary Examiner*—Ricky Ngo
*Assistant Examiner*—Pao Sinkantarakorn
(74) *Attorney, Agent, or Firm*—Alfred A. Fressola; Ware, Fressola, Van Der Sluys & Adolphson LLP

(57) ABSTRACT

The present invention relates to media synchronization. The invention is mainly addressed to synchronization of continuous media streams that are provided in data transfer systems. In a sending device, at least one of media components being transferred is provided, by means of data hiding, with synchronization information relating to one other of the media components. In a receiving device the media components are received, and synchronization information relating to one of the media component and being hid in at least one other media component is recovered from the at least one other media component, by means of which synchronization information the at least two media components are synchronized to be played.

29 Claims, 3 Drawing Sheets

AUDIO AND VIDEO SYNCHRONIZATION

FIELD OF THE INVENTION

The present invention relates to media synchronization. The invention is mainly addressed to synchronization of continuous media streams that are provided in data transfer systems.

BACKGROUND OF THE INVENTION

Some of the new applications in data transfer systems relate to transport of media components between electronic devices. The media components can be e.g. continuous media streams that are transmitted in real-time to a receiving device. An example of such an application is See-What-I-See (SWIS).

SWIS is a way of communicating—currently—via a mobile network. SWIS communication comprises typically both audio and video components that are delivered from one device to other. The basic idea of SWIS is to make a phone call and simultaneously to send real time video data captured by, or otherwise provided by a sending device. This means that the receiving device can display the video to the receiver when the sender and the receiver are having the phone communication.

SWIS can be implemented in different ways. The audio can be transmitted over circuit-switched network and the video over packet-switched network. It is also possible to transmit both over the packet-switched network (e.g. in VoIP). In circuit-switched (CS) network digital data is sent as a continuous stream of bits, whereupon there is not hardly any delay in the transmission, or the delay is substantially constant. In packet-switched (PS) network digital data is sent by in short packets, which comprise the digital data to be transmitted.

Currently, data that is carried over packet-switched network is handled by using Real-time Transfer Protocol (RTP). RTP Control Protocol (RTCP) is based on the periodic transmission of control packets to all participants in a session. A primary function of RTCP is to provide feedback on the quality of the data distribution.

Synchronization methods for audio and images used e.g. in video conferencing can be found from related art. An example of synchronization for video conferencing is disclosed in EP1057337 B1 where sound and images are synchronized by detecting any mismatch between the sound and image outputs and adjusting a variable delay in a gateway on a signal routed through said gateway until the sound and image outputs are synchronized. In this publication a video device and an audio device are interconnect by a gateway, which acquires audio signals and video signals, which gateway is capable of determining a delay between audio and video signals. The synchronization is carried out by test signals and a calculated delays.

Synchronization of two RTP streams, e.g. an audio RTP stream and a video RTP stream, is done as follows. Each RTP packet contains a timestamp for the payload of the packet. The first timestamp of the stream is set to a random value due to security reasons, and timestamps are coded as clock ticks of the native frequency of the media (usually 90 kHz for video and the sampling frequency or its integer multiple for audio). An RTCP packet stream accompanies each RTP stream. Periodically, every few seconds or so, an RTCP sender report is generated and carries the wallclock time (NTP time) that corresponds to a particular RTP timestamp. The receiver then uses the RTCP sender reports to convert RTP timestamps to wallclock time and schedules the playout of media samples accordingly.

In the basic form of e.g. the SWIS application, there is a circuit-switched call ongoing, when the sending device decides to share video with the receiving device. A packet-switched video connection is established and video is transported over e.g. RTP/UDP/IP (Real Time Protocol/User Datagram Protocol/Internet Protocol) to the receiving device. As said, video packets are likely to face a different and unpredictable amount of transmission delay than the speech frames in the circuit-switched call. No information about how to synchronize the transported video to the speech is conveyed by the transport protocols. Therefore, the receiver cannot reproduce accurate audio and video synchronization.

SUMMARY OF THE INVENTION

The current invention aims to solve a problem of synchronizing audio and video streams in a receiving device. The solution is based on utilizing data hiding techniques, which are traditionally used for digital rights management, for example. It is an object of the current invention to provide a method for processing media components, a method for playing media components, a processing module, a module for synchronizing media components, a sending device, a receiving device, a computer program product for processing and playing media components in a device.

In the method for processing media components to be transmitted to a device, at least one of the media components being transmitted is provided with synchronization information relating to one other of the at least two media components by means of data hiding.

The method for playing media components in a device, comprises steps for receiving said media components, recovering synchronization information relating to one of the media component and being hid in said at least one other media component, by means of which synchronization information said at least two media components are synchronized to be played.

The processing module for a sending device comprises means for providing at least one other media component with a synchronization information relating to one media component by means of data hiding.

The module for synchronizing media components for a receiving device comprises means for recovering, from at least one media component, hidden synchronization information relating to one other of the media component, by means of which synchronization information said at least two media components are synchronized to be played.

The sending device according to the invention comprises aforementioned processing module. The receiving device according to the invention comprises aforementioned module for synchronizing media components. The computer program product for processing media components in a device comprising code means for implementing aforementioned method for processing media components. The computer program product for synchronizing media components in a device comprising code means for implementing aforementioned method for playing media components.

In one example of audio and video synchronization the least significant bits of e.g. an RTP timestamp of a video stream corresponding to a particular speech frame are coded to the most insignificant speech bits of that frame and possibly a couple of the following frames.

The current invention provides a backward-compatible means for synchronizing e.g. audio and video. The solution can be utilized with SWIS services, but also with other systems in which different media components of real-time media sources are transported using more than one transport protocol stacks, wherein the transport protocol stacks do not provide means to synchronize the media playout between the components. Examples of media components are audio, video and timed text.

DESCRIPTION OF THE DRAWINGS

The accompanying drawings, which are incorporated in and constitute a part of this specification, illustrate examples relating to this invention and, together with the description, explain further the objects and advantages of the invention. In the drawings

DETAILED DESCRIPTION OF THE INVENTION

Figure 1:
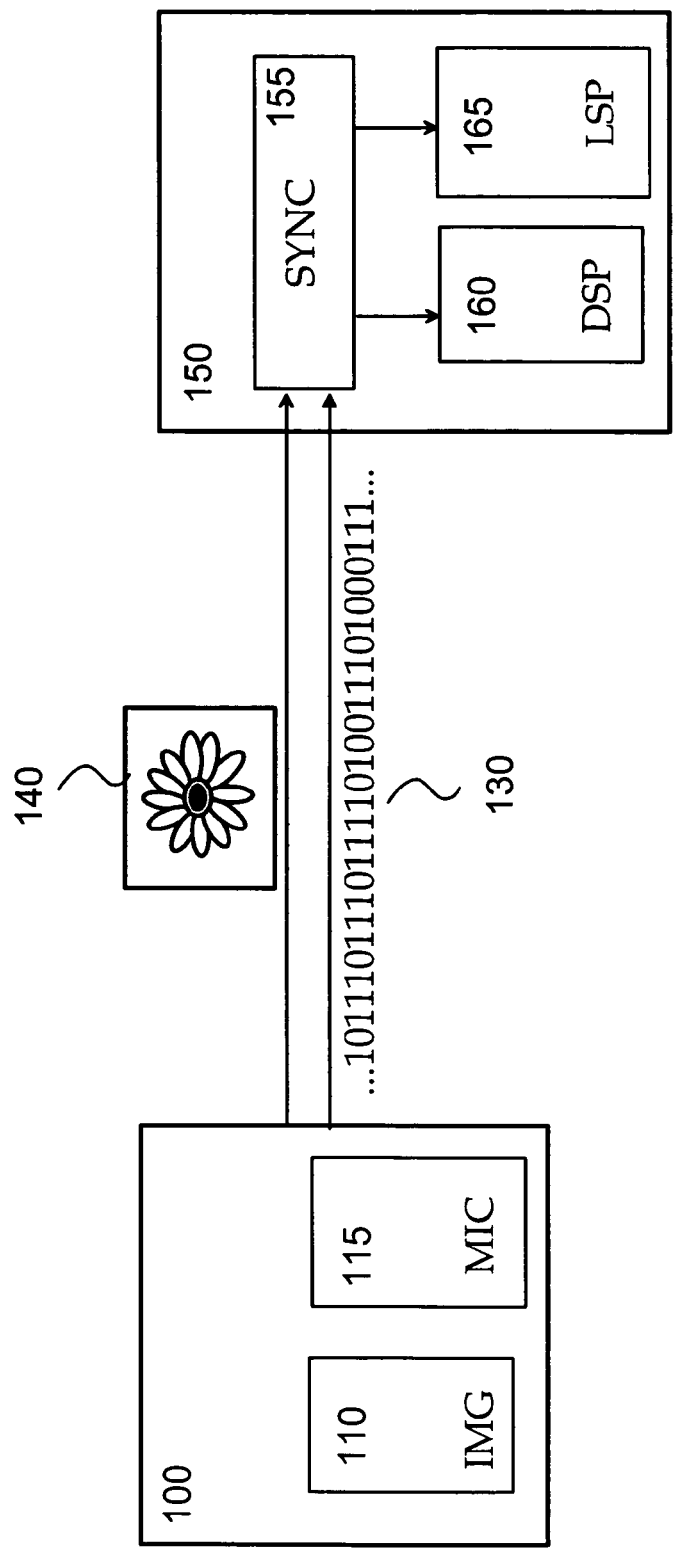
FIG. 1 illustrates an example of a system, wherein a media components are transferred from an electronic device to other.

The present invention relates to an application wherein media components are transferred from one device to another. The media components usually are streaming media components, e.g. video and audio. FIG. 1 illustrates such an example. The following description presents the SWIS application as an example, but the other possibilities are appreciated as well. The solution can be generalized in any system in which components of real-time media source are transported using more than one transport protocol stack and in which the synchronization cannot be done by protocol's own solutions. In FIG. 1 a sending device 100 transmits streaming media to a receiving device 150. The streaming media comprises media components such as an audio component 130 and a video component 140. The other 140 of the media components can be transmitted as data packets and the other 130 of the media components can be transmitted as continuous bitstream.

The operation of the sending device according to FIG. 1 described in the following also with reference to FIG. 2. The sending device 100, 200 comprises in the case of audio and video streaming at least imaging means 110, e.g. video input means (201 in FIG. 2) and an audio input means 115, 202 such as a microphone. The source of audio and video signal may be live input to the device or it may be pre-stored into the device. Live input may be acquired with the sending device 200 or streamed to the device from a peripheral device or provided otherwise. When live audio is acquired and processed in the sending device, the audio input means comprise audio signal capturing module, such as a microphone, analog-to-digital converter module, and potentially audio signal processing modules e.g. for sample rate conversion and signal enhancement. When live video is acquired and processed in the sending device, the video input means comprise an optics module including a lens, a sensor for analog to digital conversion, and potentially digital signalling processing modules e.g. for color space conversion, picture size conversion, and signal enhancement. When a pre-stored source for audio and video streams is used, the audio and video input means typically contain the following steps: coded audio and video streams are typically stored in a container file, the container file is parsed, audio and video streams are demultiplexed from the container file, and audio and video streams are decoded.

The sending device 200 further contains audio and video coding modules (204, 203) for digital signal compression. The presented invention is not limited to any particular type of a coding algorithm. The sending device 200 may also have access to readily-encoded streams obtained e.g. from peripheral devices or pre-stored files.

The synchronization data hiding block 205 in the sending device 200 receives necessary pieces of information, such as capturing timestamps of media samples according to the wallclock time of the sending device, from the audio and video input blocks (202, 201). In one embodiment of the invention, the synchronization data hiding block 205 modifies one of the coded bitstreams to include such pieces of information that enable the receiver to synchronize the playout of the two streams. In FIG. 2, the audio bitstream is modified to contain synchronization information from the video signal. In another embodiment of the invention (not depicted in any figure), the sending device 200 modifies the channel-coded stream to include such pieces of information that enable the receiver to synchronize the playout of the two streams. Even though the synchronization data hiding block 205 is presented as a separate module in FIG. 2, it can also be integrated in source encoders or channel encoders.

The channel coding blocks (206, 207) input elementary audio and video streams and encapsulate them according to the transport protocols in use. For example, video may be encapsulated according to the RTP payload specification of the video coding format, and the RTP payloads are further encapsulated according to RTP, UDP, and IP protocols, and IP datagrams are then carried according to the layer 2 (link layer) and layer 1 (physical layer) protocols in use.

Finally, the sending device 200 comprises at least one transmission blocks (208, 209) providing networking capability and means for outputting channel-coded signals from the device. In one embodiment of the invention, the transmission blocks include a radio transmitter.

Figure 2:
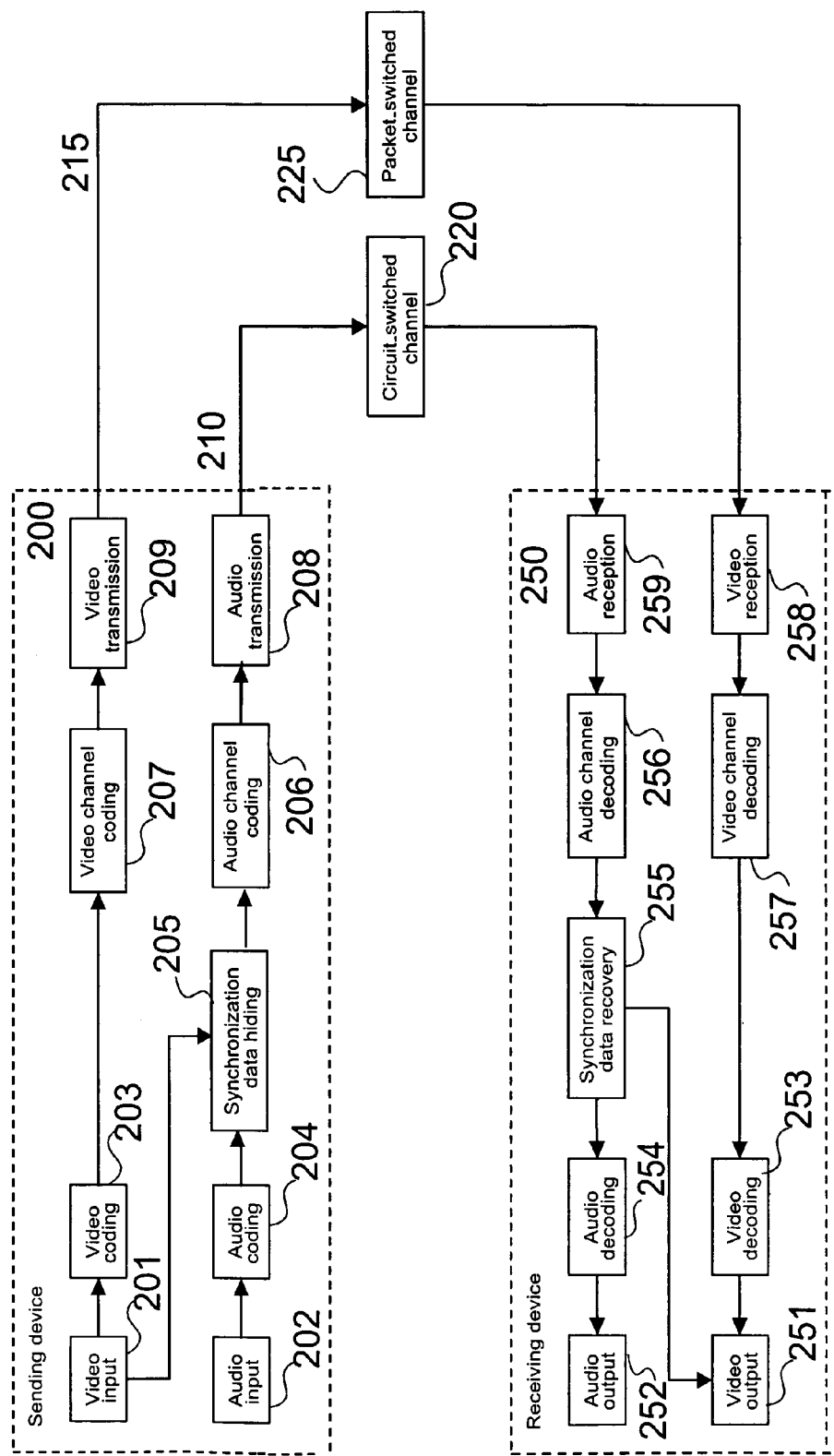
FIG. 2 illustrates an example of a system as a block diagram.

According to FIG. 2, audio and video streams are sent through separate channels (210, 215), one being a circuit-switched channel 220 and another one being a packet-switched channel 225. It will be appreciated that term "channel" is herein considered as a logical channel as perceived by a terminal, such the sending device 200 and the receiving device according to the invention 250. Thus, the network infrastructure for the two separate channels may or may not be fully or partly identical.

The receiving device 250 performs reverse operations when compared to the sending device 200. First, it receives the channel-coded audio and video streams (258, 259). Then, channel decoding (256, 257) is applied to obtain the elementary audio and video bitstreams, which are decoded to obtain uncompressed digital audio and video signals. The receiving device 250 comprises also a synchronization recovery block 255.

Figure 3:
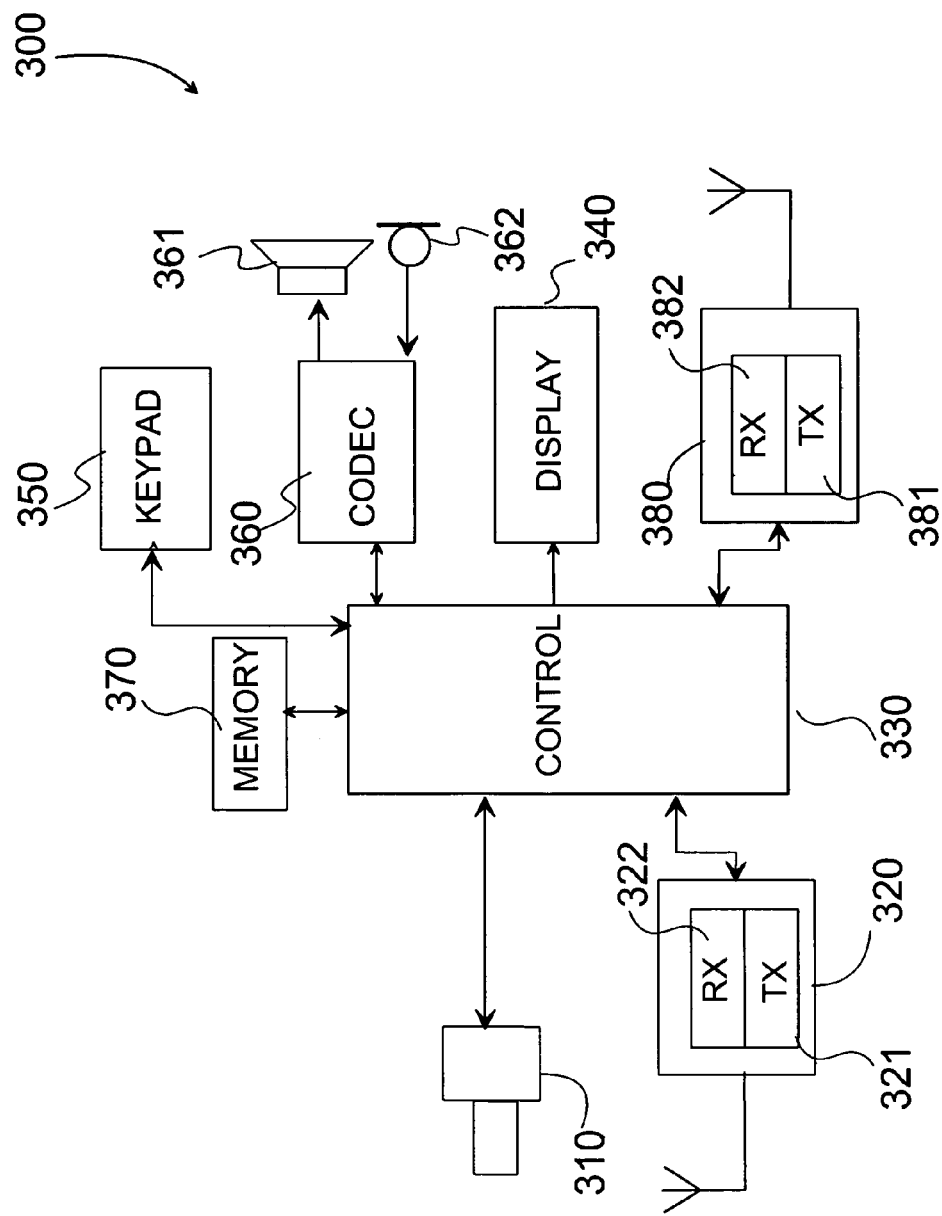
FIG. 3 illustrates an example of a receiving device.

In one embodiment of the invention, the synchronization data recovery block 255 extracts such pieces of information from the elementary audio or video stream that enable the receiver 250 to synchronize the playout of the two streams. In FIG. 3, the synchronization information is extracted from the audio bitstream. In another embodiment of the invention (not depicted in any figure), the synchronization information is extracted from channel-coded streams. Even though the synchronization data recovery block 255 is presented as a separate module in FIG. 2, it can also be integrated in source decoders or channel decoders.

Playout synchronization may happen after the decoding step, as depicted in FIG. 2, or before the decoding step (not depicted in any figure). Regardless of in which point of the media processing streams the synchronization occurs, the receiving device 250 should estimate the processing delay of the downstream processing steps for each media processing path and make the processing delay equal by delaying processing accordingly.

Decompressed audio and video signal may be output (251, 252) using modules in the receiving device 250, using peripheral output devices, and/or stored. In the case of audio and video—the modules in the receiving device 250 typically include a loudspeaker system 165 and a display 160 (see FIG. 1). Examples of peripheral output devices are a handsfree speaker and an external display. Audio and video may also be stored, either in compressed or uncompressed format. In both cases, the cross-stream recovered synchronization information is also stored or the used to derive and store such synchronization information, e.g. wallclock timestamps, that are common in both media streams.

Even though the presented invention is exemplified by a system according to FIGS. 1 and 3, the invention can be applied to any sub-system including any characteristic feature of the invention. Examples of such sub-systems are a transmitting device, a receiving device, a set of modules for data processing including a synchronization data hiding or recovery block, and a chipset for data processing including a synchronization data hiding or recovery block, a chipset including dedicated hardware and software.

The current invention is based on data hiding in the media component. This means that a cross-stream synchronization information is added to at least one component stream by data hiding technique. The following description presents two examples of the implementation for data hiding. The first example relates to data hiding in speech frames and the second example relates to data hiding in any of the RTP streams. The examples are only aimed for understanding purposes, and the skilled person will appreciate the various data hiding methods suitable for the present invention.

Data Hiding in Speech Frames

In this example, synchronization information for playout of corresponding RTP streams to speech is provided as a hidden piece of data within the coded speech bitstream. The synchronization information may include at least one feature of the following: RTP timestamp, RTP sequence number, the value of any syntax element or elements that can be used to identify a coded picture in the video stream. An example of such an element are a value of frame_num syntax element and a value of temporal reference syntax element. In addition the synchronization information can include any value that is derived form the video bitstream (e.g. as a result of the decoding process). The hidden synchronization information can be a subsampled or quantized data. It should be noted, that the hidden piece of data does not necessarily have to uniquely identify the video picture, if a series of hidden pieces of data can be matched unambiguously to the video stream.

For clarifying the previous example more it is predetermined that speech stream contains hidden data at constant intervals of 0.5 seconds starting from the first speech frame whose capture time is closest to the first transmitted video picture. The RTP timestamp clock frequency for the video stream is 90 kHz and the capturing picture rate of video is 25 Hz. Consequently, the minimum coded picture interval in terms of RTP timestamps is 3600 (in clock ticks of a 90-kHz clock). The duration of speech frames is 20 msec, and each speech frame may contain 1 bit of hidden data. Consequently, there are 25 bits available for data hiding for each 0.5 second period. In the system, 24 most significant bits of the RTP timestamp are coded and the 25$^{th}$ bit is a repetition of the first bit of the 0.5 period. It is also assumed that the end-to-end delay for circuit-switched speech is smaller than for the RTP streams.

During the speech call (without associated packet-switched streams launched yet), the recipient may otherwise operate as normally but also buffer speech frames in a sliding-window buffer, herein referred to as coded speech buffer, whose size is equal to or greater than the expected or maximum audio-video synchronization difference (+25 speech frames). It should be noticed, that the buffered frames are already played out before they are removed from the coded speech buffer (i.e. the coded speech buffer may not be a conventional pre-decoder buffer used for buffering coded data before it is input to the decoder).

At some point of the call, a video RTP stream is established and the first RTP packet is received. At that point, the corresponding speech frame is already played out, so there is no chance of audio-video synchronization at the beginning. The receiver examines the coded speech buffer as follows:

A candidate timestamp is formed from each sequence of 25 consecutive speech frames in the coded speech buffer, in which the hidden bit in the 25$^{th}$ speech frame is equal to the hidden bit in the first speech frame of the sequence. The hidden bits form the 24 most significant bits of the candidate timestamp, and the remaining eight least significant bits are set to zero.

A series of candidate timestamps are formed from those candidate timestamps that occupy all the speech frames in the coded speech buffer except possibly for less than 25 speech frames in the beginning or at the end of the coded speech buffer. If a candidate timestamp is not in any series of candidate timestamps, then that candidate timestamp is not considered further.

Those series of candidate timestamps in which the timestamp value is not monotonically increasing, are discarded.

The series of candidate timestamps that contains a candidate timestamp closest to the RTP timestamp of the first video packet is chosen.

The recipient then applies rebuffering or adaptive media playout to delay the playout of speech frames, such that the audio-video synchronization is established. The recipient continuously parses the hidden data to RTP timestamps and controls the audio and video playout clocks to maintain synchronization.

Data Hiding in RTP Streams

In this example the data is hidden to coded video signal. One example for implementing that is to use supplemental enhancement information (SEI) or user data of the video coding format or to use a dedicated RTP stream (and possibly RTP payload) for synchronization information. In the following more detailed example the supplemental enhancement information is used.

As the speech stream in circuit-switched call does not contain referable sequence numbers or timestamps, the hidden piece of data should be derived from the speech bitstream itself. It may, for example, be a repetition of the temporally closest speech frame to the video picture in which the synchronization SEI message is located.

The initial audio-video synchronization after the establishment of the RTP stream is carried out similarly to the previous example.

Signalling

In order to let the receiving device know whether the sending device uses data hiding for synchronization information, there has to be signalling from the sending device to the receiving device. The signalling may take place e.g. using the SDP (Session Description Protocol) offer/answer model on top of SIP (Session Initiation Protocol) call establishment procedures. The SDP signalling may include critical parameters to parse the synchronization information in the receiving device.

In some situations, the receiving device may not understand the signalling according to this invention. In those situations such devices can ignore the signalling without problems, because either the synchronization information will not be present in the bitstreams, or, if the synchronization information is present, it does not affect the normal decoding process of the data.

An example of the receiving device is illustrated in FIG. 3. The receiving device can also operate as the sending device. The device comprises communication means 320 having a transmitter 321 and a receiver 322 or is connected to such. There can also be other communicating means 380 having a transmitter 381 and a receiver 382 as well. The first communicating means 320 can be adapted for telecommunication and the other communicating means 380 can be a kind of short-range communicating means, such as a Bluetooth™ system, a WLAN system (Wireless Local Area Network) or other system which suits local use and for communicating with another device. The device 300 according to the example in FIG. 3 also comprises a display 340 for displaying visual information and the imaging data. Further the device 300 may comprise an interaction means, such as a keypad 350 for inputting data etc. In addition or instead of the keypad 350, the device can comprises stylus, whether the display is a touch-screen display. The device 300 comprises audio means 360, such as an earphone 361 and a microphone 362 and optionally a codec for coding (and decoding, if needed) the audio information. The device 300 can also comprise imaging means 310. A control unit 330 may be incorporated to the device 300 for controlling functions and running applications in the device 300. The control unit 330 may comprise one or more processors (CPU, DSP). Further the device comprises memory 370 for storing e.g. data, applications, and computer program code.

The person skilled in the art will appreciate that the previous examples were provided for clarifying the invention, which is to use data hiding technique for media streams for synchronization. The system and the devices may incorporate any number of other capabilities and functionalities, which suitable enhance the synchronization accuracy. Therefore it is understood that the foregoing detailed description is provided for clearness of understanding only, and not necessarily limitation should be read therefrom into the claims herein.

What is claimed is:

1. A method to be performed by a sending device comprising:
processing media components to be transmitted from the sending device to a receiving device, the media components comprising periods having more than one frame,
providing at least one of the media components being transmitted with synchronization information relating to one other of the media components,
hiding the synchronization information in the media component so that a hidden bit in a last frame of a period is equal to a hidden bit in a first frame of said period.

2. The method according to claim 1, wherein said media components are real-time media components.

3. The method according to claim 1, wherein said at least one media component and said one other media component are to be transmitted by using more than one transport protocol for different media components.

4. The method according to claim 3, wherein the synchronization information is hidden in a coded speech stream.

5. The method according to claim 1, wherein one of the media components is speech stream.

6. The method according to claim 5, wherein at least one significant bit of one of the media component corresponding to a particular frame of the speech stream is hidden to the most insignificant bits for said frame.

7. The method according to claim 1, wherein one of the media components is video stream.

8. The method according to claim 7, wherein real-time transfer protocol timestamp of another media component is used as said synchronization information.

9. The method according to claim 1, wherein the synchronization information is derived from the other media component.

10. The method according to claim 1, wherein an indication of hidden synchronized information is transmitted from a sender to a recipient.

11. A non-transitory computer readable memory stored with code for execution by a processor, which when executed by the processor implements the method according to claim 1.

12. A method to be performed by a receiving device comprising:
receiving media components in said receiving device,
recovering synchronization information relating to one of the media components from at least one other media component, said synchronization information being hid in said at least one other media component so that a hidden bit in a last frame of a period is equal to a hidden bit in a first frame of said period in said at least one other media component,
synchronizing said at least two media components to be played according to said synchronization information, and
playing media components comprising periods having more than one frame in said receiving device.

13. The method according to claim 12, wherein said media components are real-time media components.

14. The method according to claim 12, wherein one of the media components is a speech stream.

15. The method according to claim 14, wherein the synchronization information is recovered from a coded speech stream.

16. The method according to claim 14, further comprising:
buffering the speech stream
receiving a first packet of the other media stream
forming a candidate timestamp from said buffered speech stream,
forming a timestamp series of such candidate timestamps that occupy all the buffered speech stream frames,
detecting such one or many timestamp series in which the timestamp value is monotonically decreasing,
selecting such a timestamp series that contains a candidate timestamp that is closest to a real-time transfer protocol timestamp of the received first packet, and
controlling a media playout of the speech stream and the other media component by parsing the synchronization information to real-time transfer protocol timestamps of the other media component.

17. The method according to claim 12, wherein one of the media components is a video stream.

18. The method according to claim 17, wherein the synchronization information is recovered from the video stream.

19. The method according to claim 12, wherein the synchronization information is supplemental enhancement information.

20. A non-transitory computer readable memory stored with code for execution by a processor, which when executed by the processor implements the method according to claim 12.

21. A processing module configured to provide at least one media component with a synchronization information relating to one other media component and to hide the synchronization information in the media component so that a hidden bit in a last frame of a period is equal to a hidden bit in a first frame of said period.

22. A sending device comprising a module according to claim 21.

23. A module comprising:
a synchronization data recovery block configured:
to synchronize received media components comprising periods having more than one frame,
to recover synchronization information relating to one of the media components from at least one other media component, said at least one other media component having a hidden bit in a last frame of a period that is equal to a hidden bit in a first frame of said period in said at least one other media component, and
to synchronize said at least two media components to be played according to said synchronization information.

24. The module according to claim 23, wherein one of the media components is a speech stream.

25. The module according to claim 24, being configured to:
buffer speech stream,
receive a first packet of another media stream,
form a candidate timestamp from said buffered speech stream,
form a timestamp series of such candidate timestamps that occupy all the buffered speech stream frames,
detect such one or many timestamp series in which the timestamp value is monotonically decreasing,
select such a timestamp series that contains a candidate timestamp that is closest to a real-time transfer protocol timestamp of the received first packet, and
control a media playout of the speech stream and the other media component by parsing the synchronization information to real-time transfer protocol timestamps of the other media component.

26. The module according to claim 23, wherein one of the media components is a video stream.

27. A receiving device comprising a module according to claim 23.

28. An apparatus comprising:
at least one control unit,
at least one transmitter, and
at least one memory including computer program code, the at least one memory and the computer program code configured to, with the at least one control unit, cause the apparatus at least to:
encode a first type of received media into a media component,
encode another type of received media into another media component,
provide said media component with a synchronization information relating to said another media component and to hide the synchronization information in the media component and to provide an indication to locate the synchronization information from the media component, wherein the indication to locate the synchronization information from the media component comprises including at least one hidden bit in the media component, the at least one hidden bit being derived through at least one synchronization information related operation and wherein the at least one synchronization related operation comprises selection of a subset of hidden bits representing the synchronization information, and
transmit, using the at least one transmitter, signals based on the media component and the another media component.

29. An apparatus comprising:
at least one control unit, and
at least one memory including computer program code, the at least one memory and the computer program code configured to, with the at least one control unit, cause the apparatus at least to:
receive media components comprising periods having more than one frame,
recover synchronization information relating to one other of the received media components from at least one media component, said at least one other media component providing an indication to locate the synchronization information from the media component, wherein the indication to locate the synchronization information from the media component comprises including at least one hidden bit in the media component, the at least one hidden bit being derived through at least one synchronization information related operation and wherein the at least one synchronization information related operation comprises selection of a subset of hidden bits representing the synchronization information, and
synchronize said at least two media components to be played according to said synchronization information.

* * * * *

UNITED STATES PATENT AND TRADEMARK OFFICE
CERTIFICATE OF CORRECTION

| | | |
|---|---|---|
| PATENT NO. | : 7,843,974 B2 | |
| APPLICATION NO. | : 11/174292 | |
| DATED | : November 30, 2010 | |
| INVENTOR(S) | : Hannuksela | |

It is certified that error appears in the above-identified patent and that said Letters Patent is hereby corrected as shown below:

1. On the Title page of the patent at item (56) References Cited, please amend the name of US patent 6,570,945 to --Ono, et al--.

2. At column 10, line 35, claim 29, line 11, please delete the word "other".

Signed and Sealed this
Seventh Day of June, 2011

David J. Kappos
*Director of the United States Patent and Trademark Office*